United States Patent
Ono et al.

(10) Patent No.: US 6,769,609 B2
(45) Date of Patent: Aug. 3, 2004

(54) PORTABLE CARD UNIT PROCESSING APPARATUS

(75) Inventors: Akiko Ono, Kawaski (JP); Shigeru Hashimoto, Zama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/022,263

(22) Filed: Dec. 20, 2001

(65) Prior Publication Data

US 2002/0050515 A1 May 2, 2002

Related U.S. Application Data

(63) Continuation of application No. PCT/JP99/03355, filed on Jun. 23, 1999.

(51) Int. Cl.$^7$ ................................................ G06K 5/00
(52) U.S. Cl. .................... 235/380; 235/379; 235/375; 235/376; 235/492; 235/435
(58) Field of Search ................................. 235/375, 376, 235/379, 380, 435, 492, 381, 383

(56) References Cited

U.S. PATENT DOCUMENTS

| | | | | |
|---|---|---|---|---|
| 4,375,032 A | * | 2/1983 | Uchida | 235/380 |
| 5,850,077 A | * | 12/1998 | Tognazzini | 235/380 |
| 5,945,652 A | * | 8/1999 | Ohki et al. | 235/380 |
| 5,949,047 A | * | 9/1999 | Abe et al. | 235/435 |
| 5,965,860 A | * | 10/1999 | Oneda | 235/375 |
| 6,003,008 A | * | 12/1999 | Postrel et al. | 235/381 |
| 6,016,957 A | * | 1/2000 | Ohki et al. | 235/380 |
| 6,047,888 A | * | 4/2000 | Dethloff | 235/375 |
| 6,070,794 A | | 6/2000 | Niwata et al. | |
| 6,149,058 A | * | 11/2000 | Albaret | 235/380 |
| 6,168,078 B1 | * | 1/2001 | Yanagi et al. | 235/380 |
| 6,189,782 B1 | * | 2/2001 | Takami et al. | 235/375 |
| 6,268,879 B1 | * | 7/2001 | Sato | 348/14.01 |
| 6,358,188 B1 | * | 3/2002 | Ben-Yehuda et al. | 482/8 |
| 6,382,505 B1 | * | 5/2002 | Takami et al. | 235/379 |
| 6,502,078 B2 | * | 12/2002 | Kasai et al. | 705/41 |
| 6,595,413 B1 | * | 7/2003 | Sugita | 235/380 |

FOREIGN PATENT DOCUMENTS

| | | | |
|---|---|---|---|
| EP | 0 793 205 A2 | 9/1997 | |
| EP | 0 820 043 A3 | 1/1998 | |
| EP | 0 820 043 A2 | 1/1998 | |
| EP | 0 872 816 | 10/1998 | |
| JP | 9-293163 | 11/1997 | |
| JP | 9-297925 | 11/1997 | |
| JP | EP0820043 A2 * | 1/1998 | |
| JP | 10-31711 | 2/1998 | |
| JP | 10-40350 | 2/1998 | |
| JP | 10-222584 | 8/1998 | |
| JP | EP0872816 A2 * | 10/1998 | |
| JP | 11227369 A * | 8/1999 | ........... B42D/15/10 |
| JP | EP0820043 A3 * | 4/2003 | |

OTHER PUBLICATIONS

Text of First Office Action (with English translation) in corresponding international Chinese Patent Application No. 99816753.3 for Portable Card Unit Processing Apparatus.

* cited by examiner

Primary Examiner—Karl D. Frech
Assistant Examiner—Daniel Walsh
(74) Attorney, Agent, or Firm—Westerman, Hattori, Daniels & Adrian, LLP

(57) ABSTRACT

The processing apparatus including a first communicating section (23, 243), a connecting unit (14) for being detachably connected to an external apparatus, a second communicating section (26, 244), a display section (13), and a control section (26, 244) so as to transfer data between the card unit and the external apparatus while the external apparatus is connected to the connecting section, (14), and controlling the first communicating section (23, 243) and the display section (13) so as to read data from the storage section of the card unit and to display the read-out data on the display section (13) while the external apparatus is disconnected from the concentrating section (14).

7 Claims, 6 Drawing Sheets

F I G. 2
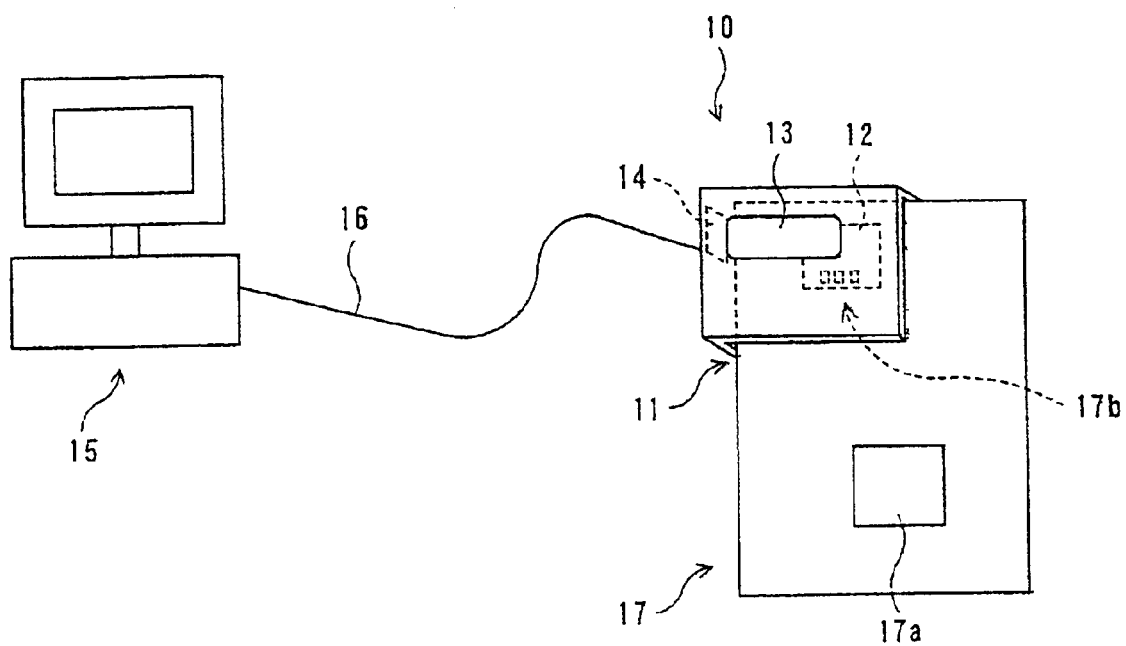

F I G. 4
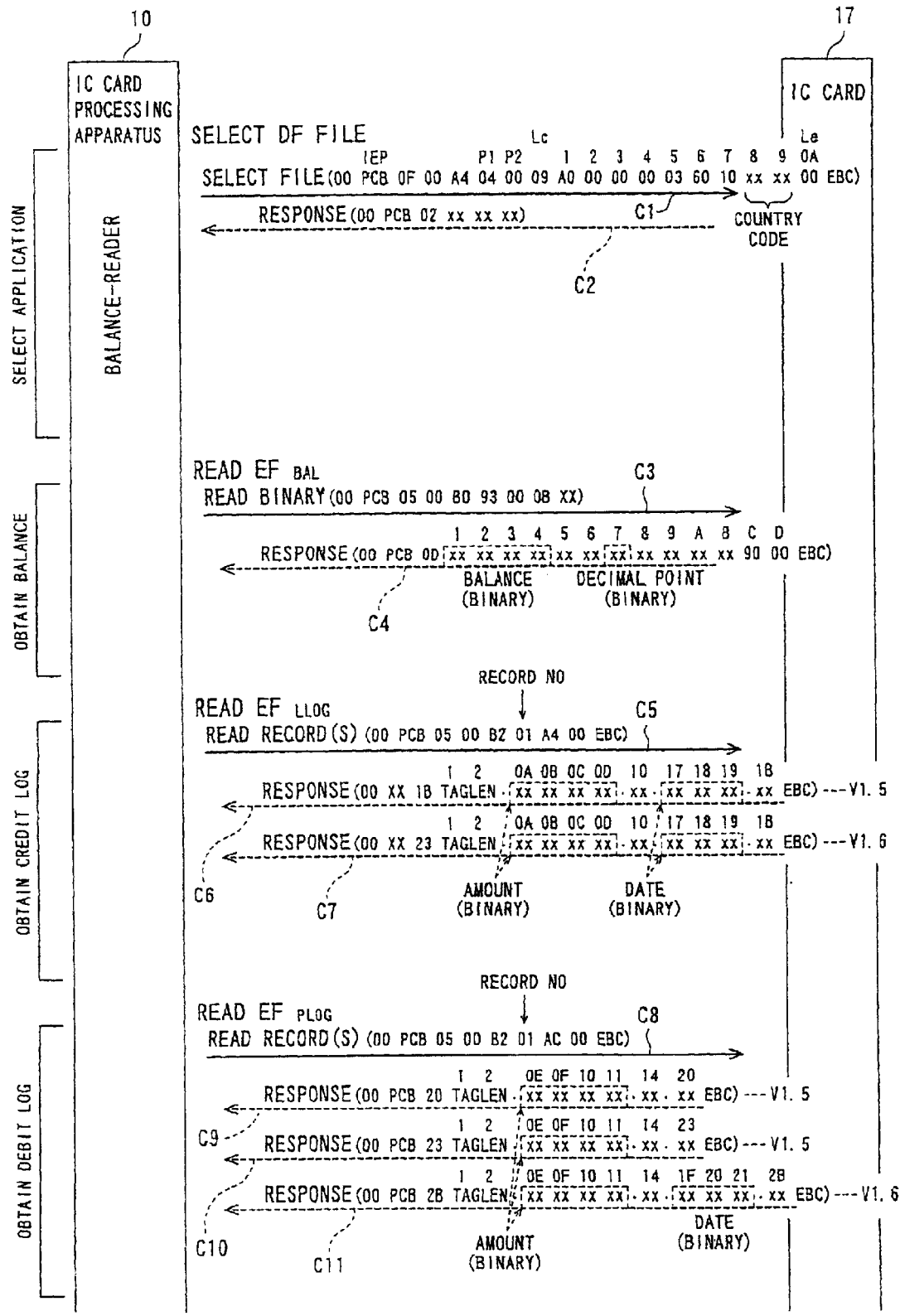

PORTABLE CARD UNIT PROCESSING APPARATUS

This application is a continuation of international application PCT/JP99/03355 filed on Jun. 23, 1999.

TECHNICAL FIELD

The present invention relates to a portable card unit processing apparatus attached thereto a card unit having a storage unit to process the card unit, in particular, to a portable card unit processing apparatus being able to read/display various information (electronic money and the like) stored in the storage unit of the card unit.

BACKGROUND ART

Electronic money systems which enable cashless commercial transactions are developed in recent years. An IC card in which an IC (Integrated Circuit) is integrated is used as a portable medium for electronic money. There is used a portable balance display (balance reader) in order that a possessor of the IC card refers to information (for example, a balance of electronic money) stored in a memory thereof.

The balance reader comprises a card inserting opening, a contact and a display unit. The user inserts the IC card from the card inserting opening. Whereby, a contact of the IC card and the contact of the balance reader are electrically connected, and balance information or the like stored in the memory of the IC card is read out and displayed on the display unit. The balance reader is formed in such a size that the user can carry it.

There is also known an IC card reader/writer (hereinafter, referred as an IC card R/W) which reads/writes value information (electronic money or the like) stored in the memory of the IC card.

The IC card R/W comprises a card inserting opening into which the IC card is inserted, a contact, and an external communication interface for connecting to an external apparatus. The IC card R/W is connected to the external apparatus such as a personal computer or the like through the above external communication interface to read or write data stored in the memory of the IC card under control of the external apparatus.

The IC card R/W also comprises a communicating means which performs card controls such as a card activating/deactivating process, data transmission/reception between the card and the external apparatus and the like, and an IC card data transmission protocol controlling means.

Incidentally, an application function such as edition or transmission of a command to the IC card is executed under control of the external apparatus.

When the data (for example, balance information on electronic money) stored in the memory of the IC card is read/written by such the IC card R/W, the IC card R/W is connected to the external apparatus through the external communication interface and a communication cable. The user then inserts the IC card into the card inserting opening to read/write the information in the IC card under control of the external apparatus.

When handling the IC card, the user prepares a balance reader to confirm a balance of electronic money. On the other hand, in order to read/write information in the IC card, the user prepares an IC card R/W. The user uses these devices each as occasion calls.

However, preparing both of the balance reader and the IC card R/W is a considerable economical burden on the user. Additionally, a setting space to usually set the IC card R/W is required.

In the light of the above problems, an object of the present invention is to provide a portable card unit processing apparatus which can display data in a storage unit of a card unit or transfer data between the card unit and an external apparatus by switching the function according to a mode of the use.

DISCLOSURE OF INVENTION

To attain the above object, a portable card unit processing apparatus of this invention is attached thereto a card unit having a storage unit to process the card unit. The portable card unit processing apparatus comprises a first communicating section for communicating with the card unit, a connecting section for being detachably connected to an external apparatus, a second communicating section for communicating with the external apparatus through the connecting section, a display section for displaying at least data read out from the storage section of the card unit through the first communicating section for card unit, and a control section for such controlling the first dedicated communicating unit and the second communicating section so as to transfer data between the card unit and the external apparatus while the external apparatus is connected to the connecting section, and controlling the first dedicated communicating section and the display section as to read out data from the storage section of the card unit and display the read-out data on the display section while the external apparatus is disconnected from the connecting section.

Accordingly, in one portable card unit processing apparatus, data transferring between the card unit and the external apparatus, and read out data from the storage section of the card unit and to display the read-out data on the display section can be switched according to conditions of connection of the external apparatus to the connecting section of the portable card unit processing apparatus. The user thus does not need to separately prepare the devices having these functions, which is economical. Additionally, it is possible to decrease a space to install the apparatus.

The control section may comprise a connection determining section for determining on the basis of a connection information signal from the connecting section whether the external apparatus is connected to the connecting section. It is thereby possible to readily determine conditions of connection of the external apparatus to the connecting section so that the operator does not need to determine a state of connection of the connecting section, which leads to improvement of the operability. When the card unit storing electronic money defined as an electronic symbol of currency in the storage section is attached while the external apparatus is disconnected from the connecting section, the control section may such control the first communicating section and the display section so as to read out balance information on the electronic money from the storage section of the card unit and to display the balance information on the display section. In a status where the external apparatus is disconnected from the connecting section, this apparatus may be used to display balance information on electronic money.

The portable card unit processing apparatus may comprise a save storage section being able to hold at least part of information stored in the storage section of the card unit, and the control section may such control the first communicating section as to read out the at least part of information from the storage section of the card unit and store the at least part of information in to the save storage section when the card unit is attached with the apparatus while the external apparatus is disconnected from the connecting section, thereby saving the at least part of information in the storage section of the card unit in the save storage section. It is therefore possible to hold the at least part of information even when the storage capacity of the storage section of the card unit is small.

When the card unit is attached to the apparatus while the external apparatus connected to the connecting section, the control section may such control the second communicating section to transfer the at least part of information stored in the save storage section to the external apparatus. When a request to transfer the at least part of information is received from the external apparatus, the control section controls the second communicating section to transfer the at least part of information stored in the save storage section to the external apparatus. It is thereby possible to use the at least part of information in the storage section of the save unit saved in the save storage section in the external apparatus.

When the card unit storing electronic money defined as an electronic symbol of currency in the storage section is attached, transaction information on the electronic money may be read out from the storage section and stored in the save storage section, whereby the transaction information on the electronic money is saved in the save storage section. It is thereby possible to hold the transaction information on electronic money even when the storage capacity of the storage section of the card unit is small.

The save storage section may be a non-volatile memory. Even when power supply to the portable card unit processing apparatus is shut down, it is possible to protect the at least part of information held in the save storage section.

BRIEF DESCRIPTION OF DRAWINGS

FIG. 2 is a schematic diagram for illustrating the structure of the portable card unit processing apparatus according to the first embodiment of this invention;

FIG. 4 is a sequence diagram for illustrating commands and responses transmitted/received between the portable card unit processing apparatus according to the first embodiment of this invention and a card unit;

BEST MODE FOR CARRYING OUT THE INVENTION (a) Description of First Embodiment

Figure 1:
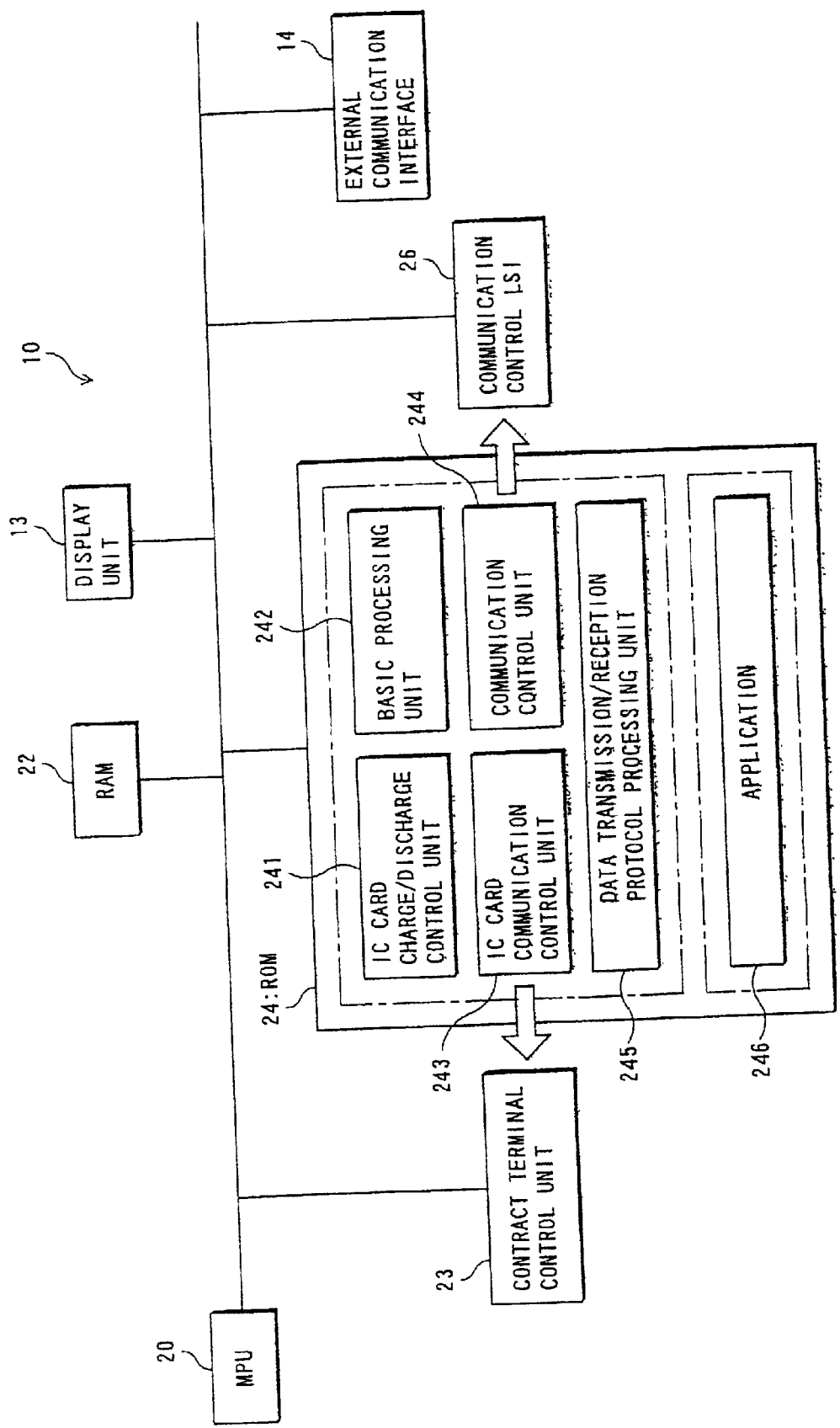
FIG. 1 is a block diagram showing a structure of a portable card unit processing apparatus according to a first embodiment of this invention.

FIG. 1 is a block diagram showing a structure of an IC card processing apparatus (portable card unit processing apparatus) 10 according to a first embodiment of this invention. FIG. 2 is a schematic diagram illustrating its structure.

Incidentally, the first embodiment will be described by way of example in which a card unit is an IC card used as a portable medium for electronic money defined as an electronic symbol of currency, and the present invention is applied to an IC card processing apparatus which processes data in the IC card.

Here, a memory (storage section) 17a is packaged in an IC card (card unit) 17 as shown in FIG. 2. In the memory 17a, there are stored a kind of electronic money, user information, use history and the like. The IC card 17 comprises a microprocessor not shown, which can control data transmission or process a cipher.

On the surface of the IC card 17 formed is a contact 17b to transmit/receive data between this apparatus 10 and an ATM of a bank, a POS terminal of a retail shop or an electronic money using device such as an automatic vending machine or the like.

Meanwhile, various processes in the IC card 17 are performed by programs formed into hardware called firmware on a chip.

The IC card processing apparatus 10 according to the first embodiment of this invention is attached thereto the IC card 17 to process the IC card 17. As shown in FIG. 2, the IC card processing apparatus 10 comprises an IC card inserting unit 11 into which the IC card 17 is inserted. The IC card processing apparatus 10 has a display unit (display section) 13 on its surface to display display data including data read out from the memory 17a of the IC card 17 (at least data read out from the memory 17a of the IC card 17).

A contact terminal 12 is formed inside the IC card inserting unit 11 at a position to contact with the contact 17b of the IC card 17. When the IC card 17 is inserted into the IC card inserting unit 11, the contact 17b of the IC card 17 is electrically connected to the contact terminal 12.

This apparatus 10 also comprises an MPU (Microprocessor Unit control section) 20, an RAM (Random Access Memory) 22, a contact terminal control unit (first communicating section) 23, an ROM (Read Only Memory: second communicating section) 24, a communication control LSI (Large Scale Integrated Circuit) 26 and an external communication interface (connecting section) 14 other than the above display unit (display section) 13.

The MPU 20 executes various firmware and an application 246 stored in the ROM 24, which functions as a control section, as will be described later.

The RAM 22 develops data or the like when the MPU 20 processes it.

Various programs formed into hardware, called firmware, used to operate this apparatus 10 are beforehand stored in the ROM 24. By reading out the firmware from the ROM 24 and executing it, the MPU 20 functions as an IC card charge/discharge control unit 241, a basic processing unit 242, an IC card communication control unit 243, a communication control unit (connection determining section) 244 and a data transmission/reception protocol processing unit 245, as will be described later.

In FIG. 1, the IC card charge/discharge control unit 241, the basic processing unit 242, the IC card communication control unit 243, the communication control unit 244 and the data transmission/reception protocol processing unit 245 formed into hardware by firmware are arranged in the ROM 24 for the sake of convenience.

The IC card charge/discharge control unit 241 controls charge and discharge of the IC card 17. The basic processing unit 242 controls basic operations of this apparatus 10, particularly, controls an operation at the time of off-line and operations relating to the display unit 13 and the like excepting the IC card 17.

The IC card communication control unit 243 controls the contact terminal control unit 23 to be described later to control communications with the IC card 17 through the contact terminal 12.

The communication control unit 244 controls the communication control LSI 26 to be described later. The communication control unit 244 controls transmission/reception of commands, data and the like between the personal computer 15 and this apparatus when this apparatus 10 is connected to the personal computer (external apparatus) through the external communication interface 14 to be described later.

The communication control unit 244 gets confirmation of whether the external apparatus (the personal computer 15 in this embodiment) is connected or not from the external communication interface 14 through the communication control LSI 26. When the external apparatus is connected, the external communication interface 14 transmits a CD (Connection Detective) signal (connection information signal) to the communication control unit 244.

The communication control unit 244 determines according to the CD signal whether the personal computer 15 is connected to the external communication interface 14 or not. In concrete, when the CD signal is transmitted (at the time of ON), the communication control unit 244 determines that the personal computer 15 is connected. When the CD signal is not transmitted (at the time of OFF), the communication control unit 244 determines that the personal computer 15 is not connected (disconnected). The communication control section 244 thus functions as a connection determining section.

The data transmission/reception protocol processing unit 245 controls a protocol for data transmission when data is transmitted/received to/from the IC card 17. For example, when this apparatus copes with protocols of plural kinds of the IC card ("T=0", "T=1" and the like), the data transmission/reception protocol processing unit 245 can absorb a difference between these protocols.

The external communication interface 14 is a connector provided according to a standard of RS 232C or the like. The external communication interface 14 is detachably connected to the personal computer 15 using a communication cable 16 or the like to transmit/receive data through the communication control LSI 26. The external communication interface 14 thus functions as a connecting section detachably connected to the personal computer 15.

This apparatus 10 is portably formed. When this apparatus 10 is disconnected from the personal computer 15 or the like by the communication cable 16 or the like, this apparatus 10 can be freely carried.

The communication control LSI 26 controls the external communication interface 14, operations of which is controlled by the communication control unit 244.

According to the first embodiment of this invention, the communication control LSI 26 and the communication control unit 244 function as a second communicating section which communicates with the personal computer 15 through the external communication interface 14.

The contact terminal control unit 23 activates the IC card 17, reads information such as balance information on electronic money, transaction history information, customer information and the like stored in the memory 17a of the IC card 17, and rewrites specific information (at least part of information stored in the memory 17a) such as the transaction history information, customer information or the like through the contact terminal 12. The contact terminal control unit 23 is controlled by the IC card communication control unit 243.

According to the first embodiment, the contact terminal control unit 23 and the above-described IC card communication control unit 243 function as a first communicating section which communicates with the IC card 17.

In the ROM 24 stored in the application 246 for such controlling the contact terminal control unit 23 and the IC card communication control unit 243 as to read data, that is, balance information on electronic money or the like, stored in the memory 17a of the IC card 17 and display the balance information or the like on the display unit 13. The MPU 20 reads the application 246 from the ROM 24 and executes it, whereby this apparatus 10 functions as a balance reader.

When the communication control unit 244 determines that this apparatus 10 is disconnected from the personal computer 15 (when the CD signal is OFF), the MPU 20 executes the application 246 to make this apparatus 10 function as a balance reader.

When this apparatus 10 functions as a balance reader, the MPU 20 reads information, that is, balance information on electronic money or the like, stored in the memory 17b of the IC card 17 through the contact terminal 12 and the contact 17b of the IC card 12 by means of the contact terminal control unit 23 according to the application 246, and displays the read balance information or the like on the display unit 13 by means of the basic processing unit 242.

When the communication control unit 244 determines that this apparatus 10 is connected to the personal computer 15 (when the CD signal is ON), the MPU 20 does not execute the application 246, but such controls the contact terminal control unit 23 and the IC card communication control unit 243 as to transfer data between the IC card 17 and the personal computer 15, thus this apparatus 10 functions as an IC card R/W under control of the personal computer 15.

When this apparatus 10 functions as an IC card R/W, the contact terminal control unit 23 reads information such as balance information on electronic money, transaction history information or the like stored in the memory 17a of the IC card 12, or writes user information, cipher information or the like in the memory 17a of the IC card 17 through the contact terminal 12 and the contact 17b of the IC card 17.

Figure 3:
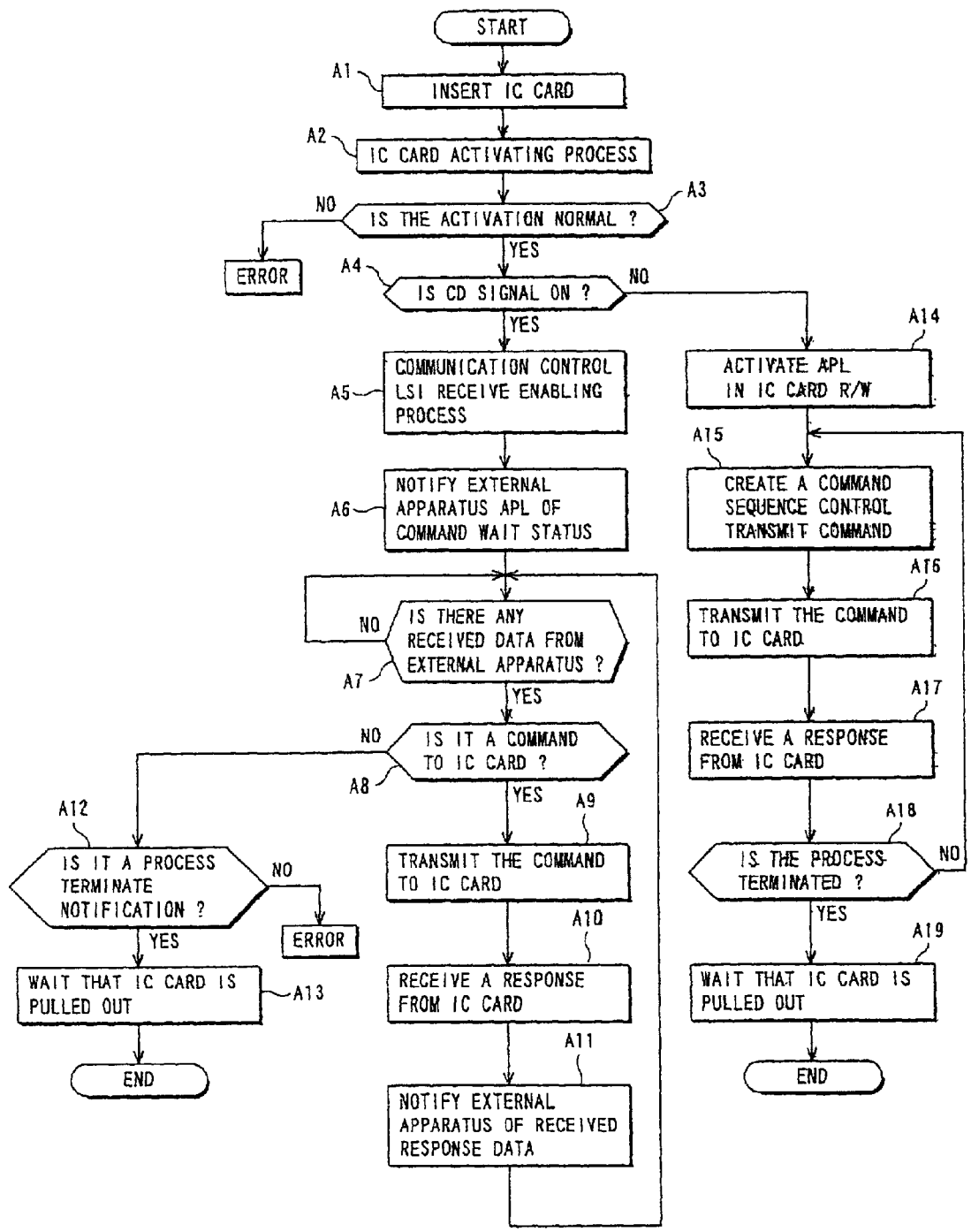
FIG. 3 is a flowchart for illustrating operations of the portable card unit processing apparatus according to the first embodiment of this invention.

Next description will be made of operations of the IC card processing apparatus (portable card unit processing apparatus) 10 according to the first embodiment of this invention according to a flowchart (steps A1 to A19) shown in FIG. 3 with reference to FIG. 4.

Incidentally, FIG. 4 is a sequence diagram for illustrating commands and responses transmitted/received between the IC card processing apparatus 10 according to the first embodiment and the IC card 17.

When the operator inserts the IC card 17 into the IC card inserting unit 11 (step A1), the contact 17b of the IC card 17 is electrically connected to the contact terminal 12, and the MPU 20 activates the IC card 17 by means of the contact terminal control unit 23 (step A2).

The MPU 20 determines whether the activating process on the IC card 17 has been normally performed or not (step A3). When the activation has not been normally performed (refer to NO route at step A3), the MPU 20 makes the basic processing unit 242 display an error message that the activation of the IC card 17 has not been normally performed on the display unit 13.

When the activation has been normally performed and a normal ATR (Answer To Reset) has been received from the IC card 17 (refer to YES route at step A3), the MPU 20 examines the CD signal through the communication control LSI 26 by means of the communication control unit 244 (step A4).

When the CD signal is ON (refer to YES route at step A4), the MPU 20 determines that the personal computer 15 is connected to this apparatus 10, and brings the communication control LSI 26 into a receivable status by the control communication unit 244 in order to function as an IC card R/W under control of the personal computer 15 (receive enabling process) (step A5).

The MPU 20 then notifies of a status (command input wait status) where the MPU 20 waits for an input of a command the application of the personal computer 15 through the external communication interface 14 and the communication cable 16 by means of the communication control unit 244 (step A6).

The MPU 20 determines by means of the communication control unit 244 whether any data is transmitted from the personal computer 15 (step A7). When any data is not transmitted from the personal computer 15 (refer to NO route at step A7), the MPU 20 again performs step A7, then is brought into the command wait status.

When the MPU 20 receives data from the personal computer 15 by means of the communication control unit 244 (refer to YES route at step A7), the MPU 20 determines by means of the communication control unit 244 whether the received data is a command to the IC card 17 or not (step A8).

When the received data is not a command to the IC card 17 (refer to NO route at step A8), the MPU 20 determines by means of the communication control unit 244 whether the received data is a process terminate notification or not (step A12). When the received data is a process terminate notification (refer to YES route at step A12), the MPU 20 waits that the user pulls out the IC card 17 from the IC card inserting unit 11 by means of the IC card charge/discharge control unit 241 (step A13).

When the received data is not a process terminate notification (refer to NO route at step A12), the MPU 20 determines that any error has occurred and data not expected has been transmitted from the personal computer 15, and makes the basic processing unit 242 display an error message of it on the display unit 13.

When the received data is a command to the IC card 17 (refer to YES route at step A8), the MPU 20 transmits the received command to the IC card communication control unit 243 through the data transmission/reception protocol 245, and the IC card communication control unit 243 transmits the command to the IC card 17 through the contact terminal control unit 23, as shown by an arrow C1 in FIG. 4 (step A9).

The MPU 20 receives a response to the personal computer 15 from the IC card 17 through the data transmission/reception protocol processing unit 245 by means of the IC card communication control unit 243, as shown by an arrow C2 in FIG. 4 (step A10). The MPU 20 then transmits the response to the personal computer 15 to the communication control unit 244 through the data transmission/reception protocol processing unit 245.

The MPU 20 brings the communication control LSI 26 into a transmittable status by means of the communication control unit 244 (transmit enabling process). After that, the MPU 20 transmits response data from the IC card 17 to the personal computer 15 (step A11).

The MPU 20 returns to step A7, then repeats transmission of commands (refer to arrows C3, C5 and C8 in FIG. 4) and reception of response data (refer to arrows C4, C6, C7, and C9 to C11 in FIG. 4) with the IC card 17 under control of the personal computer 15, as shown by the arrows C3 to C11 in FIG. 4.

Namely, in a status where the external apparatus (personal computer 15) is connected to the external communication interface 14, this apparatus 10 fulfils a driver function for transmission and reception of commands and responses between the application of the personal computer 15 and the IC card 17.

When the CD signal is OFF (refer to NO route at step A4), the MPU 20 determines that this apparatus 10 is disconnected from the external apparatus, and activates the application 246 by means of the basic processing unit 242 (step A14).

Then, the MPU 20 creates a command to be transmitted to the IC card 17 according to the application 246 (step A15), and transmits this command to the IC card communication control unit 243 through the data transmission/reception protocol processing unit 245.

The MPU 20 transmits the command to the IC card 17 through the contact terminal control unit 23 by means of the IC card communication control unit 243 (step A16). The MPU 20 receives data transmitted from the IC card 17 through the data transmission/reception protocol processing unit 245 by means of the IC card communication control unit 243 (step A17).

After that, the MPU 20 determines whether there is an input or the like signifying that the process is terminated (step A18). When the process is not terminated (refer to NO route at step A18), the MPU 20 returns to step A15.

At the above steps A14 to A17, commands (arrows C1, C3, C5 and C8) are transmitted from this apparatus 10 to the IC card 17, and responses (arrows C2, C4, C6, C7, and C9 to C11) to these command are transmitted from the IC card 17 to this apparatus 10, as shown in FIG. 4.

Whereby, a specific application in the application 246 is activated in the apparatus 10, or balance information, a transaction history (deposit log, credit log) or the like stored in the memory 17a of the IC card 17 is displayed on the display unit 13, for example.

Namely, in a status where the external apparatus (personal computer 15) is disconnected from the external communication interface 14, from the driver function for functioning as a balance reader to the application are completed in the ROM 24 of this apparatus 10, and this apparatus 10 functions as a balance reader to read data such as balance information or the like from the memory 17a of the IC card 17 and display it on the display unit 13.

When there is an input signifying that the process is terminated (refer to YES route at step A18), the IC card charge/discharge control unit 241 waits that the operator pulls out the IC card 17 from the IC card inserting unit 11 (step A19).

According to the portable card unit processing apparatus according to the first embodiment of this invention, the communication control unit 244 (MPU 20) determines according to the CD signal whether the personal computer 15 is connected to the external communication interface 14 or not. In a status where the personal computer 15 is disconnected from the external communication interface 14, this apparatus functions as a balance reader to read data such as balance information or the like from the IC memory 17a of the IC card 17 and display it on the display unit 13. In a status where the personal computer 15 is connected to the external communication interface 14, this apparatus functions as an IC card R/W to transfer data between the IC card 17 and the personal computer 15. Thus, the operator does not need to prepare both devices, that is, the balance reader and the IC card R/W, which is economical.

When this apparatus is used as an IC card R/W, this apparatus requires only a small space to be disposed, and it is unnecessary to secure the space usually.

This apparatus functions as either a balance reader or an IC card R/W according to whether the personal computer (external apparatus) 15 is connected to the external communication interface 14 or not, whereby the operator does not need to separately use the balance reader and the IC card W/R, which leads to good operability.

(b) Description of Second Embodiment

Figure 5:
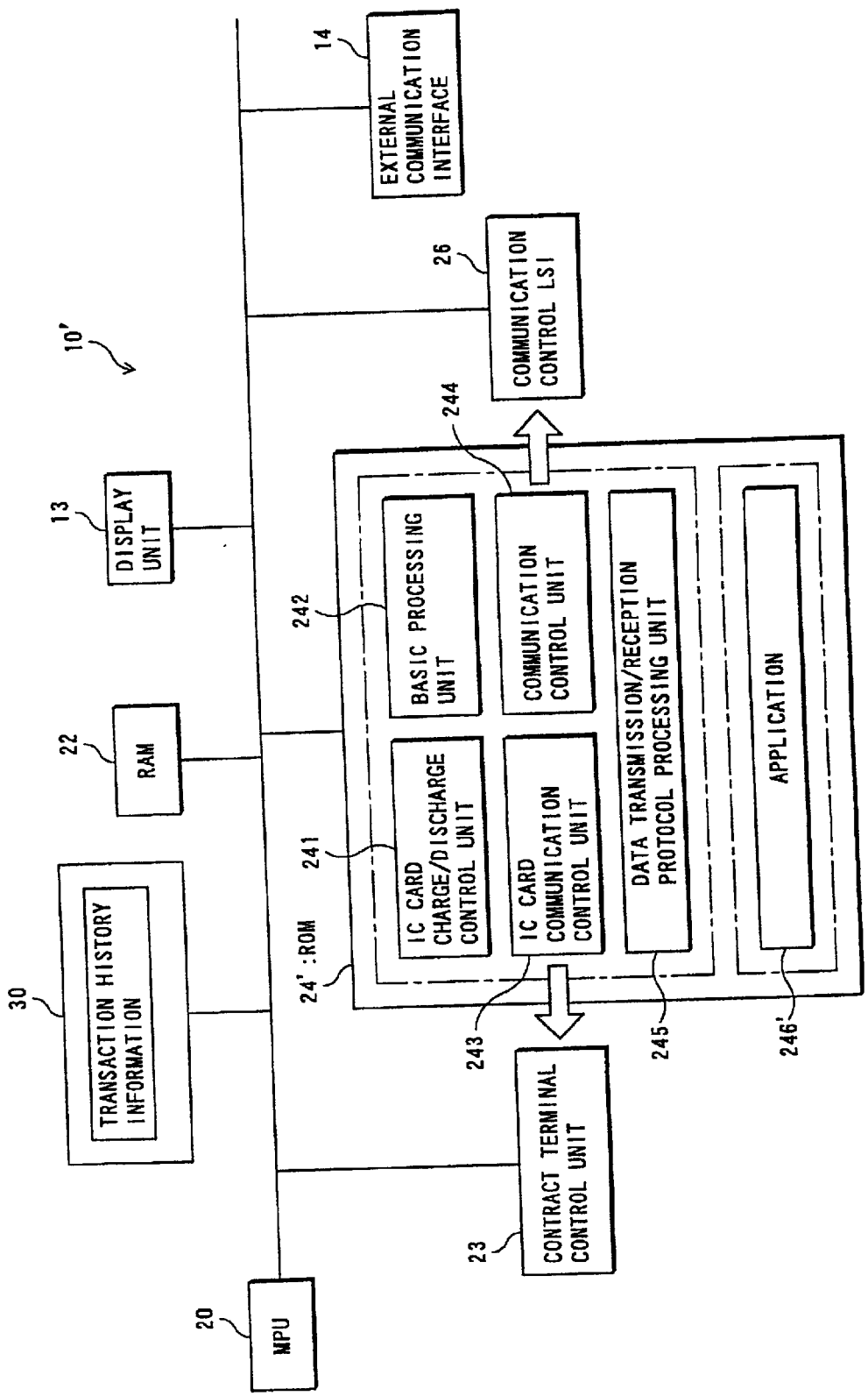
FIG. 5 is a block diagram showing a structure of a portable card unit processing apparatus according to a second embodiment of this invention.

FIG. 5 is a block diagram showing a hardware structure of an IC card processing apparatus (portable card unit processing apparatus) 10' according to a second embodiment of this invention. The IC card processing apparatus 10' shown in FIG. 5 is an IC card processing apparatus which processes an IC card (card unit) used as a portable medium for electronic money that is defined as an electronic symbol of currency, like the IC card processing apparatus 10 according to the first embodiment. The IC card processing apparatus 10' is attached thereto the IC card 17 to process it.

The portable card unit processing apparatus 10' according to the second embodiment of this invention comprises a non-volatile memory (save storage section) 30 in the portable card unit processing apparatus 10 according to the first embodiment shown in FIG. 1, and an ROM 24' instead of the ROM 24. Incidentally, like reference characters designate like or corresponding parts having been described above, detailed descriptions of which are thus omitted.

The non-volatile memory 30 functions as a save storage section which can hold specific information in the memory 17a of the IC card 17, which is configured with a non-volatile RAM, for example. Information stored in the non-volatile memory 30 is not lost even when the power source of this apparatus 10' is turned off.

In the ROM 24' stored is an application 246' instead of the application 246 shown in FIG. 1. The MPU 20 reads out the application 246' from the ROM 24', whereby this apparatus 10' functions as a balance reader.

The MPU 20 executes the application 246', whereby the application 246' realizes a function similar to that of the application 246 according to the first embodiment. When the IC card 17 is attached with the personal computer 15 disconnected from the external communication interface 14, the MPU 20 controls the contact terminal control unit 23 and the IC card communication control unit 243 to read out transaction information (transaction history information) on electronic money stored in the memory 17a of the IC card 17, and store it in the non-volatile memory 30.

When the IC card 17 is attached with the personal computer 15 connected to the external communication interface 14, the application 246' makes the MPU 20 control the communication control LSI 26 and the communication control unit 244 to transfer transaction history information stored in the non-volatile memory 30 to the personal computer 15. In particular, when a demand to transfer transaction history information stored in the non-volatile memory 30 is received from the personal computer 15, the transaction history information is transferred to the personal computer 15.

According to the second embodiment, when the IC card 17 is inserted into the IC card inserting unit 11 while the personal computer 15 is disconnected from the external communication interface 14, the MPU 20 reads out transaction information (for example, transaction history information) on electronic money stored in the memory 17a of the IC card 17 from the memory 17a, and stores it in the non-volatile memory 30 by means of the basic processing unit 242 according to the application 246.

When the IC card 17 is inserted into the IC card inserting unit 11 while the personal computer 15 is connected to the external communication interface 14, the MPU 20 controls the communication control LSI 26 and the communication control unit 244 to transfer transaction history information stored in the non-volatile memory 30 to the personal computer 15 by means of the basic processing unit 242 according to the application 246.

Figure 6:
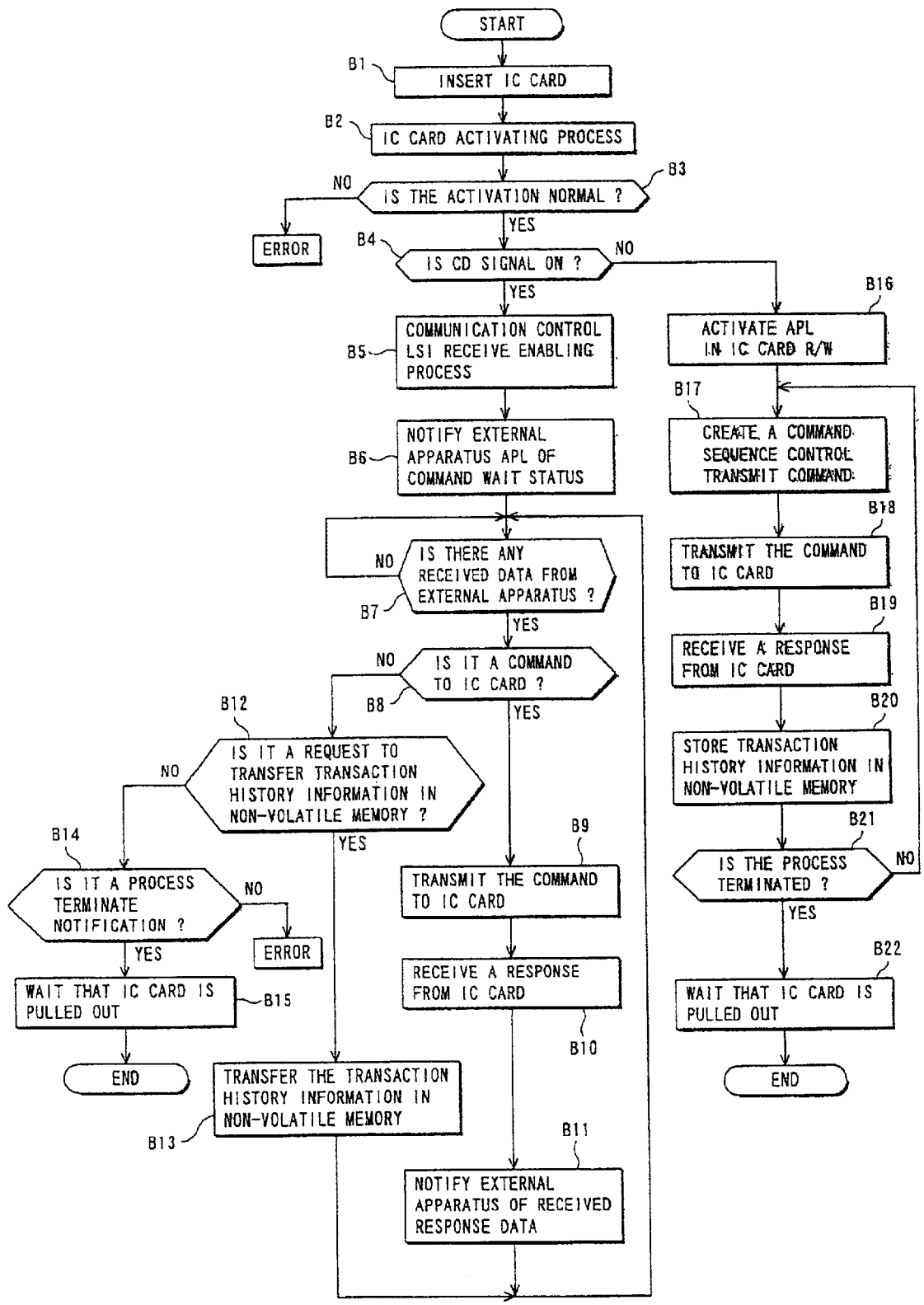
FIG. 6 is a flowchart for illustrating operations of the portable card unit processing apparatus according to the second embodiment of this invention.

Next, operations of the portable card unit processing apparatus 10' in the above structure according to the second embodiment of this invention will be described with reference to a flowchart (steps B1 to B22) shown in FIG. 6.

When the operator inserts the IC card 17 into the IC card inserting unit 11 of this apparatus 10' (step B1), the contact 17b of the IC card 17 is electrically connected to the contact terminal 12, and the MPU 20 activates the IC card 17 by means of the contract terminal control unit 23 (step B2).

The MPU 20 determines whether the activating process on the IC card 17 has been normally performed or not (step B3). When the activation has not been normally performed (refer to NO route at step B3), the basic processing unit 242 displays an error message that the activation of the IC card 17 has not been normally performed on the display unit 13.

When the activation has been normally performed and a normal ATR (Answer To Reset) has been received from the IC card 17 (refer to YES route at Step B3), the MPU 20 examines a CD signal through the communication control LSI 26 by means of the communication control unit 244 (step B4).

When the CD signal is ON (refer to YES route at step B4), the MPU 20 determines that the personal computer 15 is connected to the external communication interface 14, and brings the communication LSI 26 into a receivable status by means of the communication control unit 244 in order that this apparatus 10' functions as an IC card R/W under control of the personal computer 15 (receive enabling process) (step B5).

The MPU 20 notifies the application of the personal computer 15 through the external communication interface 14 and the communication cable 16 by means of the communication control unit 244 that the MPU 20 is in a command input wait status (command input wait status) (step B6).

The MPU 20 determines by means of the communication control unit 244 whether any data is transmitted from the personal computer 15 (step B7). When any data is not transmitted from the personal computer 15 (refer to NO route at step B7), the MPU 20 again carries out step B7, and is brought into the command wait status.

When the communication control unit 244 receives any data from the personal computer 15 (refer to YES route at step B7), the MPU 20 determines by means of the communication control unit 244 whether the received data is a command to the IC card 17 or not (step B8).

When the received data is not a command to the IC card 17 (refer to NO route at step B8), the MPU 20 determines whether the received data is a request to transfer transaction history information stored in the non-volatile memory 30 to the personal computer 15 or not (step B12). When the received data is a request to transfer transaction history information to the personal computer 15 (refer to YES route at step B12), the MPU 20 controls the basic processing unit 242 to transfer the transaction history information stored in the non-volatile memory 30 to the personal computer 15 through the external communication interface 14 by means of the communication control unit 244 and the communication control LSI 26 according to the application 246' (step B13), and returns to step B7.

When the received data is not a request to transfer the transaction history information to the personal computer 15 (refer to NO route at step B12), the MPU 20 further determines by means of the communication control unit 244 whether the received data is a process terminate notification or not (step B14). When the received data is a process terminate notification (refer to YES route at step B14), the MPU 20 waits by means of the IC card charge/discharge control unit 241 that the user pulls out the IC card 17 from the IC card inserting unit 11 (step B15).

When the received data is not a process terminate notification (refer to NO route at step B14), the MPU 20 determines that an error has occurred and data not expected has been transferred from the personal computer 15, and makes the basic processing unit 242 display a message of it on the display unit 13.

When the received data is a command to the IC card 17 (refer to YES route at step B8), the MPU 20 transmits the received command to the IC card communication control unit 243 through the data transmission/reception protocol 245, and the IC card communication control unit 243 transmits the command to the IC card 17 through the contract terminal control unit 23, as shown by an arrow C1 in FIG. 4 (step B9).

The MPU 20 then receives a response to the personal computer 15 from the IC card 17 through the data transmission/reception protocol processing unit 245 by means of the IC card communication control unit 243 (step B10). Further, the MPU 20 transmits the response to be transmitted to the personal computer 15 to the communication control unit 244 through the data transmission/reception protocol processing unit 245.

The MPU 20 brings the communication control LSI 26 into a transmittable status by means of the communication control unit 244 (transmit enabling process), after that, transmits response data received from the IC card 17 to the personal computer 15 (step B11).

The MPU 20 returns to step B7, and repeats transmission of commands and reception of response data with the IC card 17 under control of the personal computer 15.

Namely, in a status where the external apparatus (personal computer 15) is connected to the external communication interface 14, this apparatus 10' fulfils a driver function to transmit and receive commands and responses between the application of the personal computer 15 and the IC card 17.

On the other hand, when the CD signal is OFF (refer to NO route at step B4), the MPU 20 determines that the external apparatus is disconnected, and activates the application 246 by means of the basic processing unit 242 (step B16).

The MPU 20 then creates a command to be transmitted to the IC card 17 according to the application 246 (step B17), and transmits this command to the IC card communication control unit 243 through the data transmission/reception protocol processing unit 245.

The MPU 20 transmits the command to the IC card 17 through the contract terminal control unit 23 by means of the IC card communication control unit 243 (step B18), and receives data transmitted from the IC card 17 through the data transmission/reception protocol processing unit 245 by means of the IC card communication control unit 243 (step B19).

The MPU 20 reads out transaction history information stored in the memory 17a of the IC card 17 by means of the basic processing unit 242 according to the application 246', and stores it in the non-volatile memory 30 (step B20).

After that, the MPU 20 determines whether there is an input or the like signifying that the process is terminated (step B21). When the process is not terminated (refer to NO route at step B21), the MPU 20 returns to step B17.

At steps B17 to B21, this apparatus 10' activates a specific application in the application 246, displays balance information, a transaction history (credit log, debit log) or the like stored in the memory 17a of the IC card 17 on the display 13, or saves transaction history information stored in the memory 17a of the IC card 17 into the non-volatile memory 30, for example.

According to the second embodiment, in a status where the external apparatus (personal computer 15) is disconnected from the external communication interface 14, from the driver function by which this apparatus 10' functions as a balance reader to the application are completed in the ROM 24 of this apparatus 10, and this apparatus 10' functions as a balance reader to read out data such as balance information or the like from the memory 17a of the IC card 17 and display it on the display unit 13, similarly to the first embodiment.

When an input signifying that the process is terminated is received (refer to YES route at step B21), the MPU 20 waits by means of the IC card charge/discharge control unit 241 that the operator pulls out the IC card 17 from the IC card inserting unit 11 (step B22).

The portable card unit processing apparatus 10' according to the second embodiment of this invention can provide similar functions and effects to those provided in the first embodiment. Additionally, when the IC card 17 is attached with the personal computer 15 disconnected from the external communication interface 14, the MPU 20 such controls the contact terminal control unit 23 and the IC card communication control unit 243 as to read out transaction information (transaction history information) on electronic money stored in the memory 17a of the IC card 17, and store it in the non-volatile memory 30, thereby saving the transaction history information on electronic money stored in the storage unit 17a of the IC card 17 into the non-volatile memory 30. It is therefore possible to securely hold the transaction history information on electronic money even when a storage capacity of the storage unit of the memory 17a of the IC card 17 is small.

When the IC card 17 is attached with the personal computer 15 connected to the external communication interface 14, the MPU 20 such controls the communication control LSI 26 and the communication control unit 244 to transfer transaction history information stored in the non-volatile memory 30 to the personal computer 15. In particular, when receiving a request to transfer transaction history information stored in the non-volatile memory 30 from the personal computer 15, the MPU 20 transfers the transaction history information to the personal computer 15. As this, it is possible to transfer transaction history information on electronic money saved in the non-volatile memory 30 to the personal computer 15, which allows effective use of the transaction history information on electronic money in an application (for example, software for a housekeeping account-book or the like) of the personal computer 15.

Since the transaction history information on electronic money stored in the memory 17a of the IC card 17 is saved in the non-volatile memory 30, it is possible to protect the transaction history information saved in the non-volatile memory 30 even when electric power supply to the portable card unit processing apparatus 10' is shut down.

(c) Others

Note that this invention is not limited to the above examples, but may be modified in various ways without departing from the scope of the invention.

For example, the MPU 20 determines whether the personal computer (external apparatus) 15 is connected to the external communication interface 14 by examining the CD signal through the communication control LSI 26 in the first and second embodiments. However, this invention is not limited to this, but a signal for confirming the connection may be transmitted from the external apparatus, for example.

In the above first and second embodiments, the MPU 20 determines whether the personal computer (external apparatus) 15 is connected to the external communication interface 14 by examining the CD signal through the communication control LSI 26, and functions as either a balance reader or an IC card R/W according to the CD signal (ON/OFF). This invention is not limited to this, but these functions may be switched by turning a switch or the like by the user, for example.

In the above second embodiment, when the external apparatus such as the personal computer 15 or the like makes a transfer request, the transaction history information stored in the non-volatile memory 30 is transferred to the personal computer 15. However, this invention is not limited to this, but the transaction history information stored in the non-volatile memory 30 may be forcedly transferred to the personal computer 15 when predetermined conditions are satisfied.

Further, in the above first and second embodiments, the card unit is an IC card. However, this invention is not limited to this, but may be applied to another card such as an optical memory card, a radio card or the like so long as it contains a storage unit, and provide the similar functions and effects to those provided in the above embodiments.

Industrial Applicability

As above, the portable card unit processing apparatus according to this invention is attached thereto a card unit having a storage unit, and is useful to process the card unit. Particularly, this portable card unit processing apparatus is suitable to process a card unit storing electronic money defined as an electronic symbol of currency in the storage unit.

What is claimed is:

1. A portable-card-unit processing apparatus for processing data representing electronic money, defined as an electronic symbol of currency, in a storage section (17a) of a card unit (17) when the card unit (17) is attached to said apparatus, comprising:

a first communicating section (23, 243) for communicating with the card unit (17);

a connecting section (14) for being detachably and directly connected to an external apparatus (15);

a second communicating section (24, 244) for communicating with the external apparatus (15) through said connecting section (14);

a display section (13) for displaying the electronic money read out from the storage section (17a) of the card section (17) through said first communicating section (23, 243);

a save storage section (30) for holding transaction history information that are stored in the storage section (17a) of the card unit (17); and a control section (20) including:

a connection determining section (244) for determining, based on a connection information signal from said connecting section (14), whether or not the external apparatus (15) is connected to said connecting section (14);

a first control section, for controlling said first communicating section (23, 243) and said second communicating section (24, 244) 50 as to transfer data between the card unit (17) and the external apparatus (15) if said connection determining section (244) determines that the external apparatus (15) is connected to said connecting section (14), and a second control section, for controlling said first communicating section (23, 243) and said display section (13) so as to read balance information on said electronic money from the storage section (17a) of the card unit (17) and to display said balance information on said display section (13), and for controlling said first communicating section (23, 243) so as to read said transaction history information from the storage section (17a) of the card unit (17) and to store said transaction history information into said save storage section (30), when the card unit (17) is attached to said apparatus while said connection determining section (244) determined that the external apparatus (15) is not connected to said connecting section (14).

2. The portable-card-unit processing apparatus according to claim 1, wherein, when the card unit (17) is attached to said apparatus while the external apparatus (15) is connected to said connecting section (14), said control section (20) controls said second communicating section (24, 244) as to transfer said at least part of information, which is stored in said save storage section (30), to the external apparatus (15).

3. The portable-card-unit processing apparatus according to claim 2, wherein, upon receipt of a request from the external apparatus (15) for transfer of said at least part of information, said control section (20) controls said second communicating section (24, 244) as to transfer said at least part of information, which is stored in said save storage section (30), to the external apparatus (15).

4. The portable-card-unit processing apparatus according to claim 1, wherein when said card unit (17) storing electronic money defined as an electronic symbol of currency in said storage section (17a) is attached, transaction information on said electronic money is read out from said storage section (17a) and stored as said at least part of information in said save storage section (30).

5. The portable-card-unit processing apparatus according to claim 1, wherein said save storage section (30) is a non-volatile memory.

6. A portable-card-unit processing apparatus for processing data representing electronic money, defined as an electronic symbol of currency, in a storage section (17a) of a card unit (17) when the card unit (17) is attached to said apparatus, comprising:

a first communicating section (23, 243) to communicate with the card unit (17);

a connector (14) adapted to be directly attached to an external apparatus (15);

a second communicating section (24, 244), communicably connected to said connector (14), to communicate with the external apparatus (15) through said connector (14);

a display (13), communicably connected to said first communicating section (23, 243), to display the electronic money read out from the storage section (17a) of the card section (17) through said first communicating section (23, 243);

a save storage section (30), communicably connected to said first communicating section (23, 243), to hold transaction history information that are stored in the storage section (17a) of the card unit (17); and a controller (20), communicably connected to said first communicating section (23, 243), said second communicating section (24, 244) and said display (13), including:

a connection determining section (244) to determine, based on a connection information signal from said connector (14), whether or not the external apparatus (15) is connected to said connector (14);

a first controller, to control said first communicating section (23, 243) and said second communicating section (24, 244) so as to transfer data between the card unit (17) and the external apparatus (15) if said connection determining section (244) determines that the external apparatus (15) is connected to said connector (14), and a second controller, to control said first communicating section (23, 243) and said display (13) so as to read balance information on said electronic money from the storage section (17a) of the card unit (17) and to display said balance information on said display (13), and to control said first communicating section (23, 243) so as to read said transaction history information from the storage section (17a) of the card unit (17) and to store said transaction history information into said save storage section (30), when the card unit (17) is attached to said apparatus while said connection determining section (244) determined that the external apparatus (15) is not connected to said connector (14).

7. A portable-card-unit processing apparatus for processing data representing electronic money, defined as an electronic symbol of currency, in a storage section (17a) of a card unit (17) when the card unit (17) is attached to said apparatus, comprising:

a first communicating section (23, 243) to communicate with the card unit (17);

a second communicating section (24, 244) to communicate with the external apparatus (15);

a display (13), communicably connected to said first communicating section (23, 243), to display the electronic money read out from the storage section (17a) of the card section (17) through said first communicating section (23, 243);

a save storage section (30), communicably connected to said first communicating section (23, 243), to hold transaction history information that are stored in the storage section (17a) of the card unit (17); and a controller (20), communicably connected to said first communicating section (23, 243), said second communicating section (24, 244) and said display (13), including:

a connection determining section (244) to determine whether or not the external apparatus (15) is connected to said portable-card-unit processing apparatus;

a first controller, to control said first communicating section (23, 243) and said second communicating section (24, 244) so as to transfer data between the card unit (17) and the external apparatus (15) if said connection determining section (244) determines that the external apparatus (15) is connected to said portable-card-unit processing apparatus, and a second controller, to control said first communicating section (23, 243) and said display (13) so as to read balance information on said electronic money from the storage section (17a) of the card unit (17) and to display said balance information on said display (13), and to control said first communicating section (23, 243) so as to read said transaction history information from the storage section (17a) of the card unit (17) and to store said transaction history information into said save storage section (30), when the card unit (17) is attached to said apparatus while said connection determining section (244) determined that the external apparatus (15) is not connected to said portable-card-unit processing apparatus.

* * * * *

UNITED STATES PATENT AND TRADEMARK OFFICE
CERTIFICATE OF CORRECTION

PATENT NO. : 6,769,609 B2
DATED : August 3, 2004
INVENTOR(S) : Akiko Ono et al.

It is certified that error appears in the above-identified patent and that said Letters Patent is hereby corrected as shown below:

<u>Title page,</u>
Item [56], References Cited, FOREIGN PATENT DOCUMENTS, please change the "JP 9-297925 11/1997," into -- JP 9-297825 11/1997 --.

Signed and Sealed this

Nineteenth Day of April, 2005

JON W. DUDAS
*Director of the United States Patent and Trademark Office*